United States Patent
Lo et al.

(10) Patent No.: US 6,523,040 B1
(45) Date of Patent: Feb. 18, 2003

(54) METHOD AND APPARATUS FOR DYNAMIC AND FLEXIBLE TABLE SUMMARIZATION

(75) Inventors: Ming-Ling Lo, Yorktown Heights, NY (US); Kun-Lung Wu, Yorktown Heights, NY (US); Philip Shi-Lung Yu, Chappaqua, NY (US)

(73) Assignee: IBM Corporation, Yorktown Heights, NY (US)

( * ) Notice: Subject to any disclaimer, the term of this patent is extended or adjusted under 35 U.S.C. 154(b) by 0 days.

(21) Appl. No.: 09/339,516

(22) Filed: Jun. 24, 1999

(51) Int. Cl.[7] ............................................... G06F 17/30
(52) U.S. Cl. ...................................................... 707/101
(58) Field of Search ............................... 707/101, 1, 5, 707/9

(56) References Cited

U.S. PATENT DOCUMENTS

| | | | |
|---|---|---|---|
| 5,077,668 A | 12/1991 | Doi | 364/419 |
| 5,638,543 A | 6/1997 | Pedersen et al. | 395/751 |
| 5,867,164 A | 2/1999 | Bornstein et al. | 345/357 |
| 5,991,754 A * | 11/1999 | Raitto et al. | 707/2.4 |
| 6,023,696 A * | 2/2000 | Osborn et al. | 707/3.4 |
| 6,205,451 B1 * | 3/2001 | Norcott et al. | 707/204.101 |
| 6,298,342 B1 * | 10/2001 | Graefe et al. | 707/101 |

* cited by examiner

*Primary Examiner*—Wayne Amsbury
*Assistant Examiner*—Cam Linh Nguyen
(74) *Attorney, Agent, or Firm*—Dilworth & Barrese, LLP (57) ABSTRACT

A method for performing table summarization. In a data network requests arrive at random from viewing devices (i.e., PC, PDA, laptop, etc.) to view objects which oftentimes contain large tables. The table summarization method compresses the rows/columns of the large tables in addition to the column formats to more easily display the table on the viewing device, which oftentimes has a limited display capability. A set of default rules is specified for determining how the table compression is to be performed. In addition to the default rules, a user may specify a user viewing preference to further modify the table display. The table summarization method is performed dynamically. That is, it is performed in real-time in response to a user request which typically is issued over a data network such as the Internet.

26 Claims, 11 Drawing Sheets

1104

| ID | Name | Home Address | Division | Dept. | Sex | Age | Job Title |
|---|---|---|---|---|---|---|---|
| | J.D., M.S., P.A. | A city (2) B city (1) | 6 | 234, 235, 239 | M, F | 28-49 | SALES |
| | S.F., J.S. | A city (1) B city (1) | 8 | 318 | F | 31-42 | R&D |

| ID 810 | Name 811 | Home Address 812 | Division 813 | Dept 814 | Sex 815 | Age 816 | Job Title 817 |
|---|---|---|---|---|---|---|---|
| 100 | John Doe | 30 A street A city, XY 11111 | 6 | 234 | M | 30 | field sales |
| 900 | Mary Someone | 45 C street A city, XY 11234 | 6 | 235 | F | 28 | sales planning |
| 304 | Peter Aperson | 12 D street B city, XY 11567 | 6 | 239 | M | 49 | field sales |
| 610 | Sherry Fairlady | 34 F street B city, XY 11456 | 8 | 318 | F | 31 | research staff mbr |
| 500 | Jane Smart | 103 K street A city, XY 11111 | 8 | 318 | F | 42 | project manager |

| ROW/COLUMN REDUCTION RULES FOR EMPLOYEE TABLE ||
|---|---|
| I. DEFAULT PARTITION ATTRIBUTE ||
| AGE | PARTITION BY 10 |
|  |  |
| II. DEFAULT COMBINATION FUNCTIONS ||
| ID° | DON'T CARE |
| Name | list_initial () |
| Home Address | count_city () |
| Division | count () |
| Dept | don't care |
| Sex | list () |
| Age | range () |
| Job Title | common_ancestor () |

*FIG. 9*

| ID | Name | Home Address | Division | Dept | Sex | Age | Job Title |
|---|---|---|---|---|---|---|---|
| | J.D., S.F. | A city (1), B city (1) | 6(1), 8(1) | | M, F | 30..31 | employee |
| | M.S. | A city (1) | 6(1) | | F | 28 | sales planning |
| | P.A., J.S. | A city (1), B city (1) | 6(1), 8(1) | | M, F | 42..49 | employee |

| USER PREFERENCE RULES FOR EMPLOYEE TABLE (FIG. 9) | |
|---|---|
| I. DEFAULT PARTITION ATTRIBUTE — 1102 | |
| Employee's Division | |
| | |
| II. COMBINATION FUNCTION — 1103 | |
| Dept. | list() |

| ID | Name | Home Address | Division | Dept. | Sex | Age | Job Title |
|---|---|---|---|---|---|---|---|
| | J.D., M.S., P.A. | A city (2) B city (1) | 6 | 234, 235, 239 | M, F | 28-49 | SALES |
| | S.F., J.S. | A city (1) B city (1) | 8 | 318 | F | 31-42 | R&D |

*FIG. 11b*

METHOD AND APPARATUS FOR DYNAMIC AND FLEXIBLE TABLE SUMMARIZATION

BACKGROUND OF THE INVENTION

1. Field of the Invention

The present invention generally relates to the field of information retrieval and access, and more particularly to a method for compressing a large table of information to be easily viewed by various types of digital devices having unique display capabilities.

2. Discussion of the Art

As the Internet becomes increasingly popular, more and more non-PC types of devices, such as smart phones and PDAs (personal digital assistants), are being used to access information on the Internet. These devices are generally connected to the Internet either by wired or wireless connections. Similar to the laptop or notebook computers, these non-PC devices tend to be mobile (i.e. handheld) devices. They generally have unique and often limited hardware capabilities, both in their display and processing capabilities. As such, it is very difficult for a content serve to organize information into a table so that it can be easily browsed by the users of PCs and various non-PC devices having disparate display and processing capabilities. This problem is particularly severe when the table contains a large number of rows and columns that cannot be fit into the limited display of the viewing device.

It is very important, however, that most applications are capable of displaying a large table of information, especially as more and more back-end databases are made available through the Internet. For example, more and more people are using not only PCs but also their PDAs to access their e-mails, to search or scan product items from an electronic catalog, and to search airline flight schedules on the Internet. For many users, the electronic mailbox can contain a large list of unread e-mails. The list of product items from a catalog can be exceedingly large as well. The potentially large list of e-mails as well as product items is very difficult to display effectively on a PDA or even on a regular PC. Further, such a long list of items is also very difficult for a user to browse.

Various image compression techniques have been proposed to represent an image at many different levels of detail. For example, in "A Framework for Optimization of a Multiresolution Remote Image Retrieval System," by A. Ortega et al., Proceedings of IEEE InfoCom, 1994, a system was disclosed to transmit images (including video) in multiple resolutions. Also, in "The JPEG Still Picture Compression Standard," by G. Wallace, IEEE Transactions on Consumer Electronics, vol. 38, no. 1, February 1992, the JPEG image compression standard was described to represent images at multiple resolutions.

In the area of text processing, various automatic abstracting schemes have been disclosed to perform document summarization. For example, U.S. Pat. No. 5,077,668 discloses a method for producing an abstract of a document. The method is capable of producing a concise abstract indicative of the content of the document automatically. U.S. Pat. No. 5,638,543 discloses a method in which regions of a document, such as sentences and blocks of sentences, are scored and classified based on their scores. An abstract of the document can then be formed based on the classified sentences. U.S. Pat. No. 5,867,164 discloses a real-time interactive document summarization system which allows a user to continuously control the amount of details to be included in a document summary.

These references all assume that the data in a document is of a uniform data type. However, a table can contain a list of attributes/columns having a plurality of data types. As a result, table summarization (i.e. compression) cannot be performed by simply applying a uniform compression or abstracting function, as described in the prior art.

Thus, there is a need for a flexible and dynamic table summarization method to reduce not only the number of rows but also the width and/or the number of columns so that a table can be formed from a plurality of data types, and then displayed and easily browsed by users having different kinds of viewing devices.

SUMMARY OF THE INVENTION

The present invention discloses a method for flexible and dynamic table summarization. Table summarization as used herein may be generally defined as a method of compressing the rows and columns of an input table containing data having a variety of data formats, to generate an output table having a reduced row/column count and/or format such that the output table is manageable for viewing on a plurality of viewing devices each having unique display capabilities.

Briefly stated, the table summarization method involves performing a row reduction operation and a column reduction operation on an input table. Row reduction generally involves collapsing groups of original rows from an input table into a smaller number of resultant rows according to a set of predefined row reduction rules. Column reduction may be performed in a number of ways including, for example, simply dropping a column, reducing a data type to a shorter format, and merging multiple columns into a single column.

In an exemplary embodiment of the present invention, a data network connects a plurality of viewing devices with content servers, and proxy servers act as intermediary communicating nodes connecting the content servers to the viewing devices. In an exemplary implementation, a viewing device typically makes a request to browse an object containing one or more tables of information. When a viewing device makes an object request, a set of pre-defined row and column reduction rules (i.e. meta-data), uniquely associated with and specific to each table, is accessed to perform table summarization, when necessary, on one or more of the tables contained within the requested object. That is, table summarization is only required when it is determined that one or more tables require compression or reduction to accommodate the viewing device.

In accordance with the present invention, a method for transforming a table into a summarized table includes the steps of defining meta-data to be associated with said table, said meta-data comprising row reduction and combination rules, receiving a request to view the table from a viewing device, transforming the table in response to the request to view the table by the viewing device in accordance with said meta-data.

The present invention also provides a method for further defining column value transformation to be included as part of said defined meta-data.

In addition, preferred embodiments may also include defining a viewing preference ruleset that will supplement the meta-data rules. That is, the user viewing preference ruleset will be used as an adjunct for those rules not explicitly specified in the meta-data.

Yet another element of a preferred embodiment includes a provision for including the specifications of the viewing device to perform summarization of the data structure.

BRIEF DESCRIPTION OF THE DRAWINGS

The features, objects, and advantages of the present invention will become more apparent from the detailed description set forth below when taken in conjunction with the accompanying drawings, in which:

FIG. 11b is an illustrative example of a resultant summarized table of FIG. 8 using the user preference row/column reduction rules of FIG. 11a.

DETAILED DESCRIPTION OF THE PRESENT INVENTION

The requested object will typically be stored on one of the content servers in the data network along with the meta-data (i.e., default row/column reduction rules). Upon the content server receiving an object request from a viewing device via the proxy server, the object along with the meta-data is sent from the content server to the proxy server closer to the viewing device on the network making the object request. The proxy server then performs table summarization based on the following: (1) meta-data (i.e., default row/column reduction rules); (2) the specifications of the viewing device; and (3) a viewing preference ruleset of the user. When a viewing preference ruleset is provided by the user, it will supplement the meta-data rules. That is, the user viewing preference ruleset will be used as an adjunct for those rules not explicitly specified in the meta-data. Once table summarization has been performed at the proxy server, the newly summarized table is then forwarded to the requesting viewing device.

The table summarization method of the present invention provides the following features and advantages. The method is flexible and dynamic. It is flexible in that it can adapt to the various hardware capabilities of the viewing devices and user preferences. It is also flexible in that it can deal with both numeric and non-numeric data types. It is dynamic in that the computation of table summarization is performed in real-time (i.e. when requested ). That is, table summarization is not precomputed in advance and stored at the server. An advantage of dynamic computation is that the content server need not store tables with different degrees of reduction for different devices. A user can also easily change his/her viewing preferences without triggering a re-computation on the content server. Moreover, no propagation problems arise when changes are made to the original table. Because the method is performed in real-time time any changes made to the original table will be automatically reflected when table summarization is performed in a subsequent viewing request.

Figure 1:
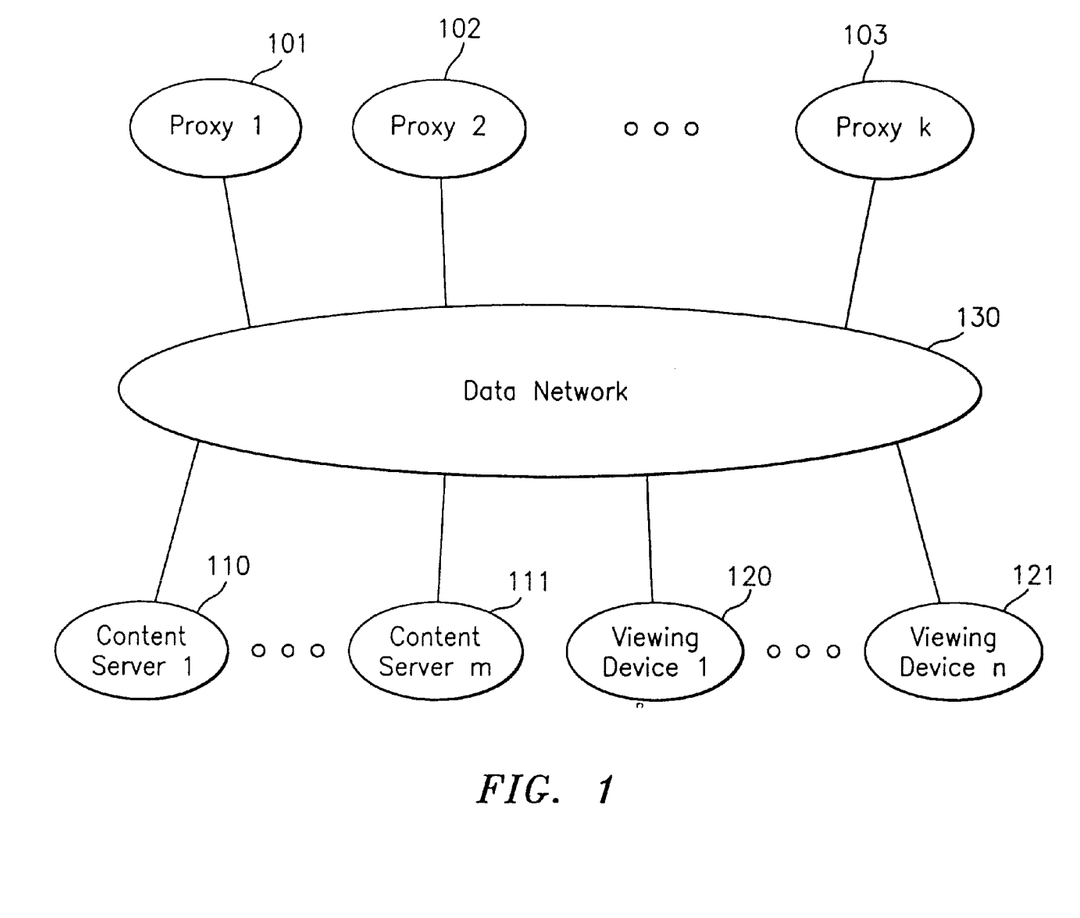
FIG. 1 provides an exemplary illustration of the overall general architecture of a data network in accordance with the present invention.

The overall architecture of a data network in accordance with an exemplary embodiment of the present invention is illustrated in FIG. 1. Viewing devices 120, 121 may be connected through proxy servers (or proxies) 101, 102, 103 to access information residing on the content servers 110, 111. The viewing devices, proxies and content servers may be connected through a data network 130, such as the Internet. As is well known in the art, proxies are commonly used to improve access times, to cache information objects locally, and to perform object transformations if necessary. For example, ISP, (Internet service providers) commonly employ a network of proxies at various locations to achieve such benefits.

The method of the present invention, i.e., table reduction (compression) is preferably performed by the content servers 110, 111; however, it can also be performed by the proxy servers 101, 102, 103, or the viewing devices 120, 121 if the viewing devices have sufficient computing capabilities. In the case where the requested object is on one of the content servers in the data network along with the meta-data, the content server would typically receive an object request from a viewing device via a proxy server. The proxy server then performs table reduction based on (1) meta-data; (2) a viewing re-select, when specified; and (3) the specifications of the viewing device. It should be appreciated that a user preference may be specified in advance (i.e., pre-registered with the proxy server). When the user has not pre-registered a user preference, the user may be shown a few sample rows in real-time to specify his/her preference.

Table reduction (compression) is generally performed by applying the meta-data (table reduction rules)which are specific to each table stored within the object to be viewed. The table reduction rules (meta-data) are preferably stored with the original objects at the content servers 110, 111. It is preferable to store the meta-data at the content servers because the content server has full knowledge of the construction of each table stored thereon. However, the content server may not always accommodate the storage of the meta-data due to a number of reasons including legacy and/or costs. When the meta-data cannot be stored on the content server the proxy servers 101, 102, 103 have the option of storing the meta-data at the proxy server. This is not an optimum solution because a proxy server is not dedicated to a particular content server, and as such, would be required to store meta-data from all content servers that it communicates with in the network. This would overburden each proxy server's storage requirements. A better solution would be for the proxy server to utilize (i.e., store)

a pre-registered user viewing preference ruleset, column/row reduction rules or some default table reduction rules to perform table summarization. To accommodate such a situation, the viewing device capabilities as well as user preference column/row reduction rules are preferably maintained by the proxies 101, 102, 103. This can generally be accomplished through a registration process.

Operational Overview

In an exemplary embodiment, a viewing device makes a request, via a proxy server, to a content server to view an object. The content server responds to the request from the viewing device by sending the requested object, possibly having one or more tables, and associated meta- data defining the row/columns reduction rules, to the proxy server acting as an intermediary communication node. The proxy server, upon receiving the object and meta-data, then performs a table summarization when it is determined that one or more tables within the requested object requires table reduction or compression. That is, not every table contained within the requested object will necessitate row/column compression, i.e., be so large as to present difficulties for a viewing device to view the table. In the situation where table summarization is warranted, the proxy server receiving the table(s) and each table's associated meta-data must take into account the meta-data, the viewing device's capabilities/limitations and possibly a user viewing preference in the situation where a user viewing preference was previously pre-registered with the proxy. After the proxy server performs table summarization in accordance with the method of the present invention, the object including the summarized table is then forwarded from the proxy server to the viewing device for display.

To perform row reduction, a row partition method is needed to define which groups of rows are to be combined or collapsed. Row partitioning may be implemented in a number of ways. A basic method is based on row IDs. For example, the row partitioning rule might state: "do not combine the first 5 rows and then combine every subsequent 20 rows into a single row". Alternative row partitioning rules may be based on one or more partition attributes. For example, the row partitioning rule might state: collapse all the rows with the attribute Sex=Female into one resultant row and collapse all the rows with the attribute Sex=Male into a second resultant row. A default partition attribute is generally defined as part of the row reduction rules.

In row reduction, a resultant row represents a summary of two or more original rows. Namely, combinations of original rows are collapsed into single summary rows. Depending on the column data type (ASCII, Numeric, etc. . . . ), the column value of the resultant row can contain, inter alia, the same value (if all the values in the original rows are the same), or the same value plus a count (i.e., the number of value occurrences), NULL (indicating different values on the original rows), or a majority value (e.g., 8 of the 10 original values are the same). If a column is of a numeric data type, the column value of the resultant row can be the average value, the range of values, or the maximum/minimum. On the other hand, if a column value is an ASCII string, the column value of the resultant row can be a set of key words, the first sentence or the first paragraph. Finally, if a column is of a certain well-defined hierarchical semantic data type, the column value of the resultant row can be the common ancestor in the domain hierarchy. For example, in the case of an automobile hierarchy, if "gasoline powered" cars at one hierarchical level, are sub-grouped as "high-octane" and "low-octane" cars at a lower hierarchical level, then the resultant column value is represented simply as "gasoline powered" thereby removing the lower hierarchical distinction between high and low octane automobiles in the resultant row.

Column reduction may be performed in a number of ways. One method is to simply drop the column. Another method is to reduce the data type into a shorter format. For example, a salary of $123,456 could be displayed as 123K. For a "heart disease", one can simply use an abbreviation of HD. Yet another method is to merge multiple columns into a single one. For example, one can combine a two columns Sex=F and Age=25 into a single column Sex/Age=F/25. For a three-column address, such as Street, City, and Zip Code, these can be merged into a single column with all the information combined.

Referring to FIG. 1, viewing devices 120, 121 may include, for example, a personal computer (PC), a workstation, a smart phone, a video phone, a personal digital assistant, etc. Proxy servers 101, 102, 103 may be a PC server (Netfinity), RS/6000 servers or an S/390 server running, for example, an Internet Connection Server (ICS) which is a registered product sold by IBM. The data network 130 may be, for example, the Internet, the World Wide Web, an Intranet, or a local area network (LAN). Content servers 110, 111 may be a PC server, a RS/6000 server, or an S/390 server running Lotus Go Web server and IBM Netcommerce server.

Proxy Server Configuration

As previously described, the data network of the exemplary embodiment preferably includes a number of proxy servers acting as intermediary communicating nodes to facilitate the exchange of data between the viewing devices and content servers on the network.

Figure 2:
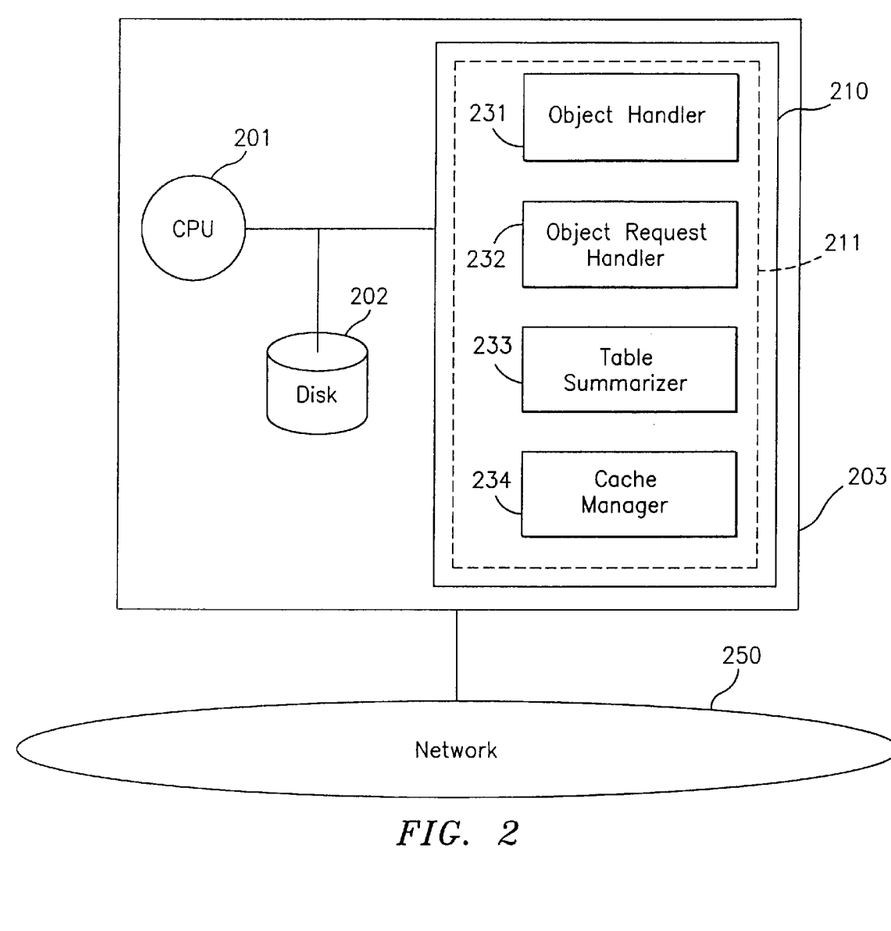
FIG. 2 is a general block diagram illustrating a proxy server in accordance with a preferred embodiment of the present invention.

FIG. 2 is a general block diagram illustrating the configuration of a proxy server in accordance with an exemplary embodiment of the present invention. A proxy server, generally designated as item 203, is used to represent a computing node that can service requests through a network (130, 250). Proxy server 203 preferably includes a CPU 201, memory 210 such as RAM (random access memory), and a storage device 202 such as a disk. Proxy server logic 211 may be stored within the memory 210. Proxy server logic 211 is preferably embodied as computer executable code, which is loaded from disk 202 into memory 210 for execution by the CPU 201.

Figure 3:
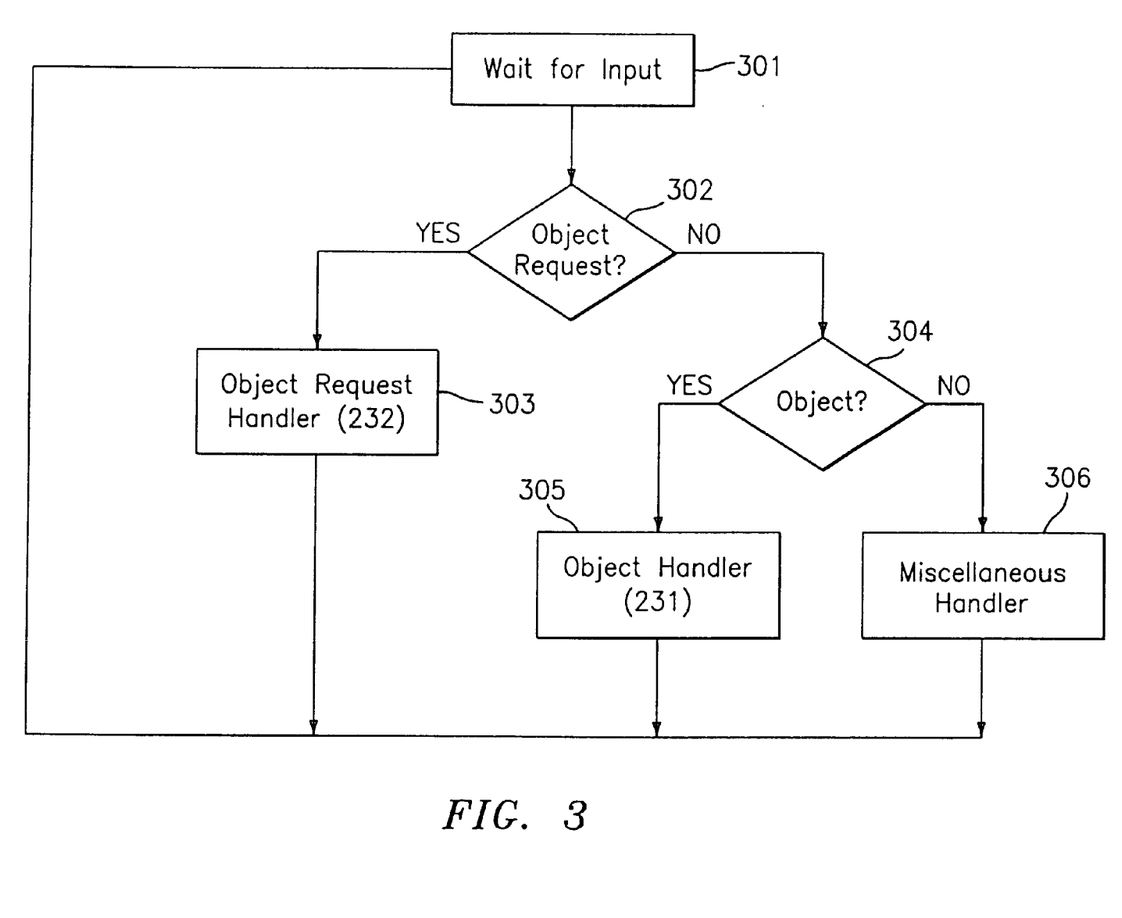
FIG. 3 is a flowchart illustrating the general method of the operation of a proxy server when the server receives input from a viewing device in accordance with a preferred embodiment of the present invention.
Figure 4:
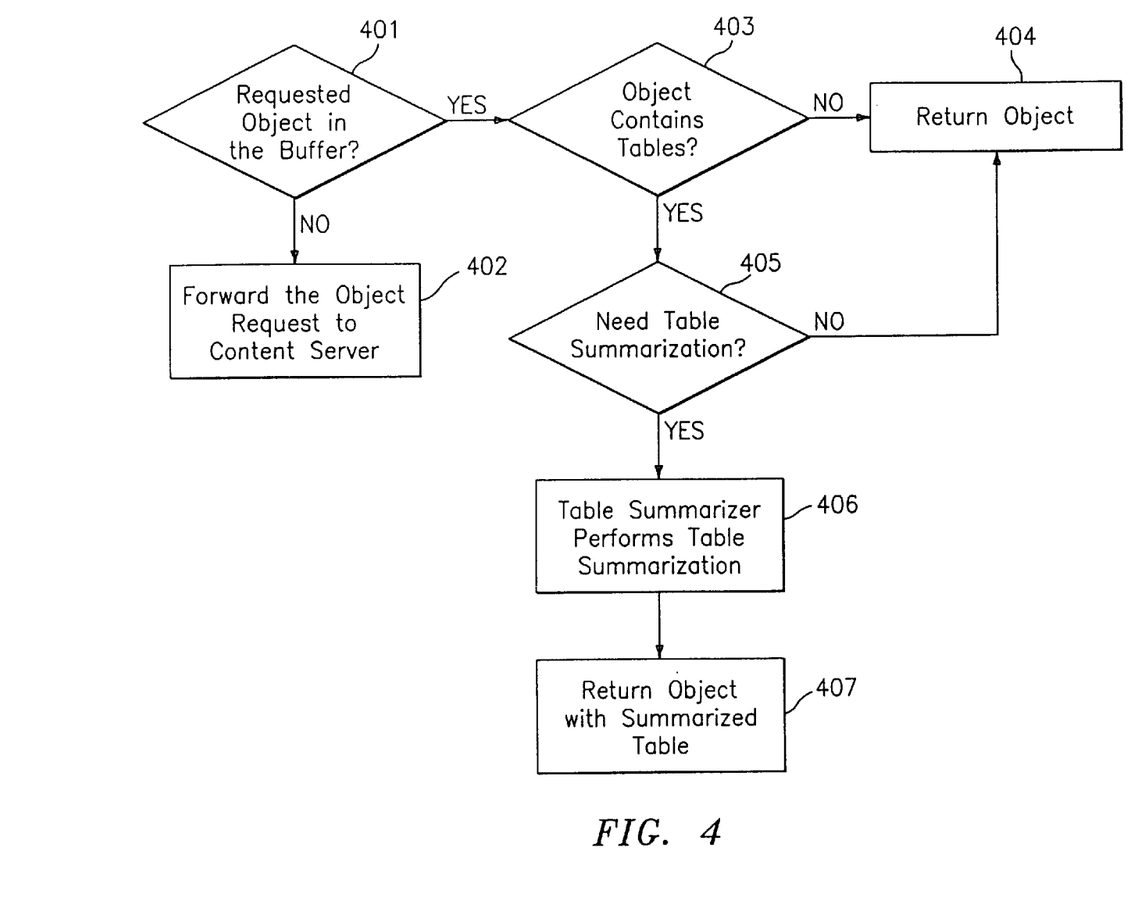
FIG. 4 is a flowchart illustrating the general method of operation of an object request handler module of a proxy server for processing an object request in accordance with a preferred embodiment of the present invention.

Proxy server logic 211 includes an object handler module 231 (described in FIG. 5) and object request handler module 232 (described in FIG. 4). In the exemplary embodiment, the proxy server logic 211 also includes a table summarizer module 233, which performs table summarization in accordance with the method of the present invention. Specifically, table summarization is performed according to a requesting device's display capabilities and either a default set of rules (meta-data) associated with each table, or a user viewing preference when specified. The table summarizer is preferably embodied as a computer program which performs table transformation to reduce the rows and columns of a table in accordance with the method of the present invention. Proxy server logic 211 may also include a cache manager 234, which maintains a copy of the meta-data, and the original table to avoid repeating the transfer of the same information from the content server to the proxy server. Proxy server logic 211 is described in more detail with reference to FIG. 3.

Those skilled in the art will appreciate that the meta-data of default table reduction rules can be embedded inside the object document with a special tag to indicate such. For example, one can simply specify the meta-data with a special user-defined tag in XML. Alternatively, a separate object can be maintained just for the meta-data for table reduction rules. When the original object is requested, the associated meta-data object and the original object are both transferred. Moreover, the table reduction rules can also contain default column reduction rules.

Proxy Server: General Operation

Referring now to FIGS. 2 and 3, FIG. 3 illustrates a flow chart illustrating the general operation of a proxy server when it receives an input or request in accordance with an exemplary embodiment of the present invention. At step 301, the proxy server waits for input. Depending on the type of input received, different actions are taken by the proxy server. The input or request may be one of an object request (e.g., a request to view an object) from a viewing device, an object received from a content server, or a miscellaneous request (i.e., FTP request). At step 302, if the input received is an object request (e.g., an HTTP request from a PDA), then the object request handler module 232 is invoked at step 303. The detailed operations of servicing such requests by the object request handler module 232 are described with reference to FIG. 4. If at step 302, the input is not an object request, then a second determination is made at step 304 to determine if the input is an object received from a content server. If the input received is an object received from a content server, (e.g., an HTML document), the object handler module 231 is invoked at step 305. The detailed operations of the object handler module 231 are described with reference to FIG. 5. If the input is not an object received from a content server, such as for all other types of miscellaneous requests, i.e., FTP requests, the miscellaneous handler module (not shown in FIG. 2) is invoked at step 306.

Proxy Server: Object Request Handler Module

FIG. 4 is a flow chart for showing the steps of the method for handling an object request representing another type of received input. FIG. 4 is a more detailed flow chart of step 303 shown in FIG. 3 (i.e., object request handler module 232). Step 303 assumes that the proxy server has received an object request as input from a viewing device.

Beginning at step 401, the object request handler 232 first checks with the cache manager 234 if the requested object is available in the cache buffer. If not found locally in the cache buffer, at step 402, the proxy server forwards the object request to the content server specified in the URL of the viewing device request. Otherwise, if the requested object can be found in the local cache buffer, at step 403, the proxy server checks the object to see if the object contains one or more tables. If no tables are found within the requested object, then at step 404, the locally cached object is simply returned to the requesting viewing device without the necessity of performing table summarization for display. If the requested object, however, does contain one or more tables, then at step 405, the proxy server checks to determine whether table summarization is required. Table summarization is considered to be required if the table size is too large for the requesting viewing device or if the table presentation is different from a predefined user preference. If table summarization is not required, then the requested object is returned unmodified at step 404 to the viewing device for display. Otherwise, if table summarization is required, it is performed by the table summarizer module 233 of the proxy server, at step 406, to reduce the size and presentation of a table according to: (1) associated meta-data, (2) device viewing capability, and (3) a user specified viewing preference when specified. After table summarization is performed, at step 407, the proxy server returns the object containing the summarized table to the viewing device for display.

Proxy Server: Object Handler Module

Figure 5:
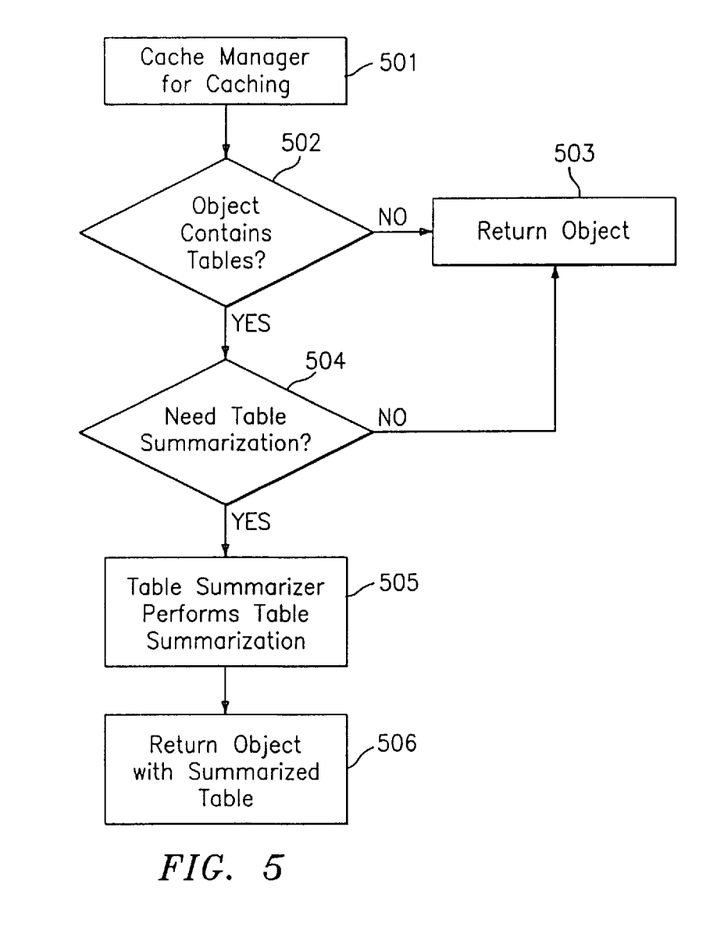
FIG. 5 is a flowchart illustrating the general method of operation of an object handler module of a proxy server for processing an object in accordance with a preferred embodiment of the present invention.

FIG. 5 is a flow chart for showing the steps of the method for handling an object representing another type of received input. FIG. 5 is a more detailed flow chart of step 305 shown in FIG. 3 (i.e., object handler 231). Step 305 assumes that the input received by the proxy server is an object from a content server.

Beginning at step 501, the proxy server first invokes the cache manager for caching the receiver object. At step 502, the proxy server checks to see if the object contains one or more tables. If there are no tables it simply forwards the object to the viewing device making the request for display, at step 503. Otherwise if there is at least one table, at step 504, the proxy server further checks to see if the table(s) need to be summarized (i.e., compressed). If table summarization is required, the table summarizer module 233 is used to perform the table summarization algorithm at step 505. The detailed steps associated with table summarization will be explained with reference to FIG. 6. At step 506, the object with the one or more summarized table(s) is returned to the viewing device for display.

Proxy Server: Table Summarization Module

Figure 6:
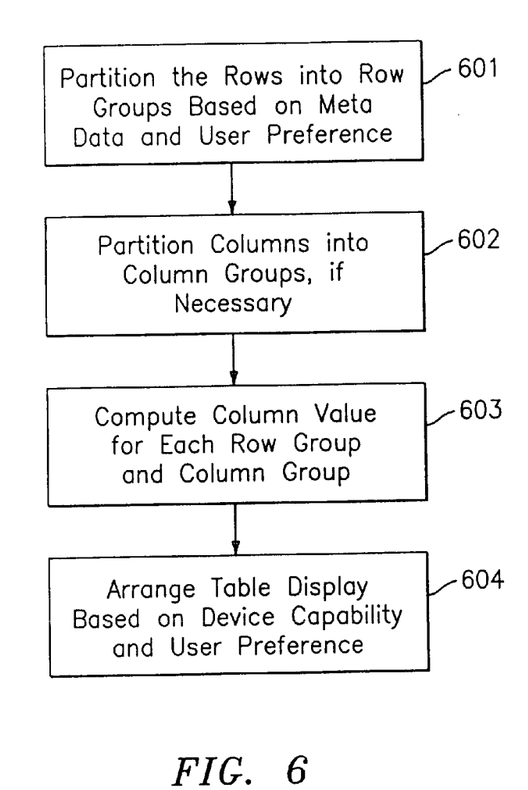
FIG. 6 is a flowchart illustrating the general method of operation of a table summarizer module of a proxy server for performing table summarization in accordance with a preferred embodiment of the present invention.

FIG. 6 is a flow chart for showing the steps of the method for performing table summarization. FIG. 6 is a more detailed flow chart of step 406 shown in FIG. 4 and step 505 shown in FIG. 5. Table summarization is performed by the table summarizer module 233 of the proxy server 203 (see FIG. 2). The table summarizer module 233 is used to perform the method steps of the present invention associated with compressing or reducing the row/column configuration in accordance with a set of predefined rules (i.e., meta-data), viewing device capabilities, and a user viewing preference ruleset. The method generally involves row reduction based on partition rules followed by column reduction.

Step 601 is directed to row reduction. At step 601, the table summarizer partitions the rows into row groups based on row partition rules as specified in the meta-data or by a user viewing preference if one was pre-specified. At step 602, the table summarizer further partitions the columns into column groups, if necessary. That is, in certain cases the meta-data may only consist of row reduction rules with no corresponding rule definitions for reducing the number of columns. In such a case column partition is not performed. At step 603, for each original row group identified, the table summarizer computes a single new resultant row in accordance with the row reduction rules. The column values for the new resultant row represent the column groups. The column values for the new row are computed based on the supplied meta-data or a user preference rule set when applicable. Finally, at step 604, the summarized table is arranged for display according to the particular device capability.

Illustrative Example

Figure 7:
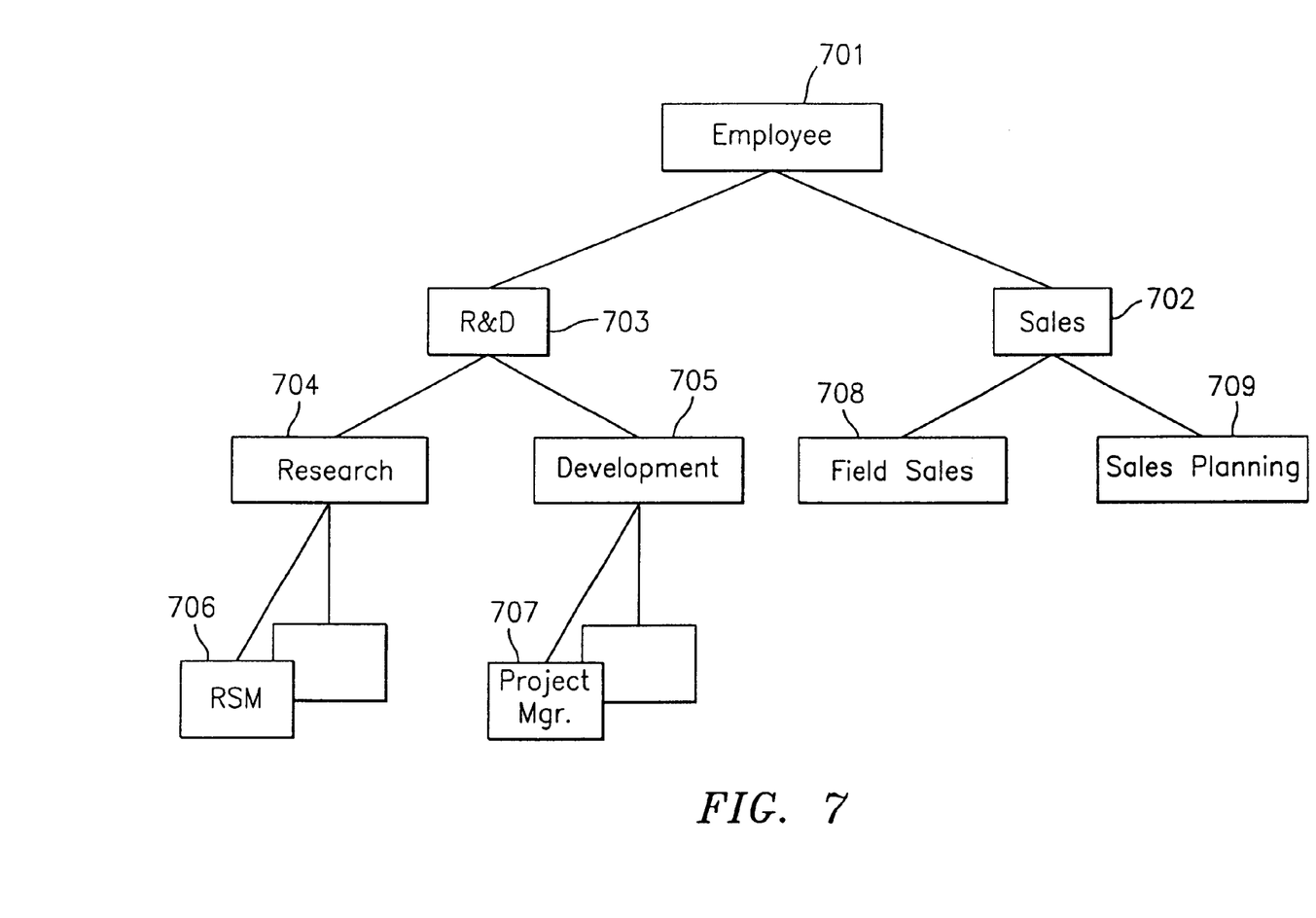
FIG. 7 is an illustrative example of a Job Title Heirarchy to further illustrate table summarization in connection with the present invention.
Figure 8:
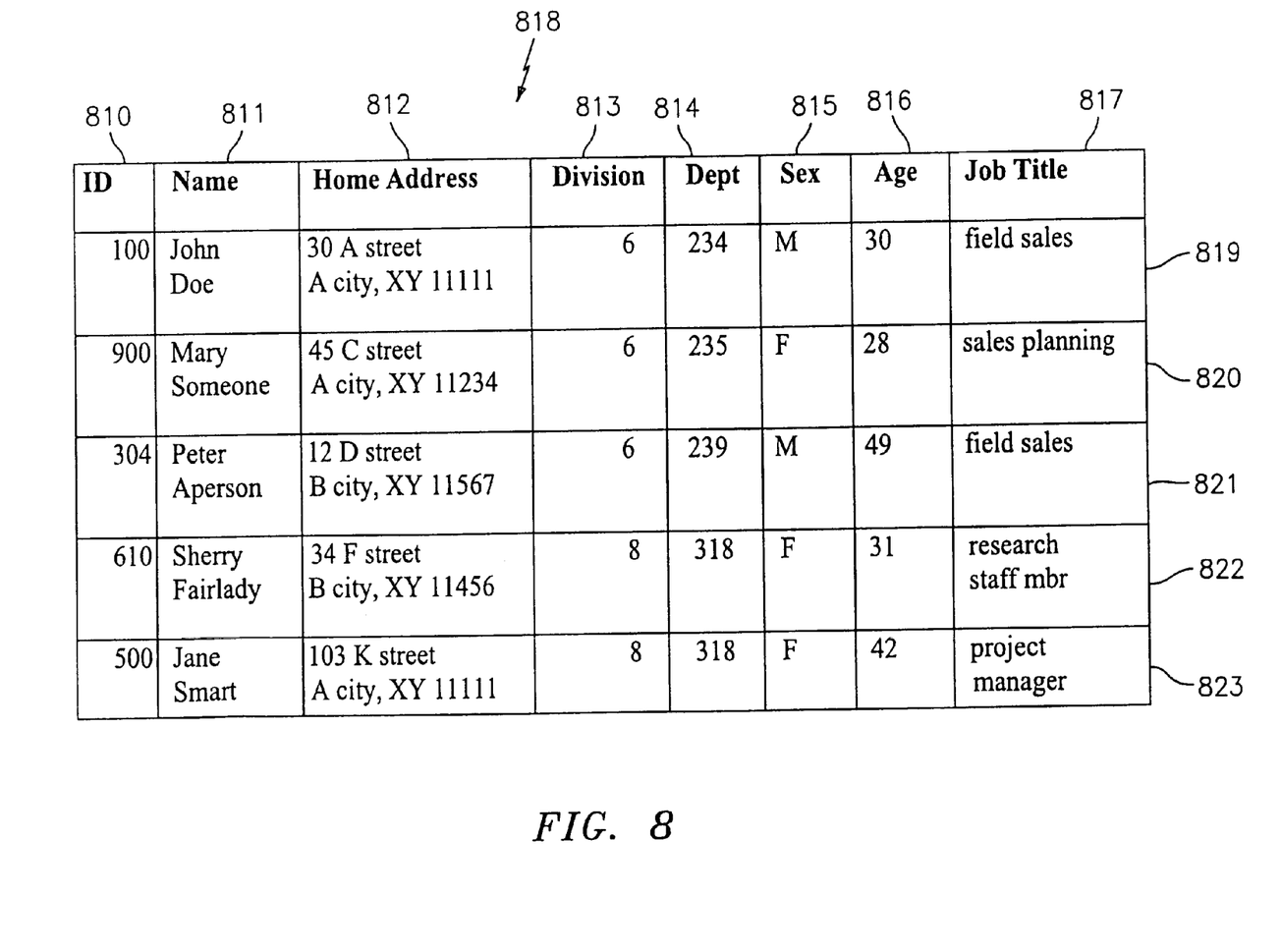
FIG. 8 is an illustrative example of an employee records table for illustrating an original table on which summarization is to be performed.
Figure 9:
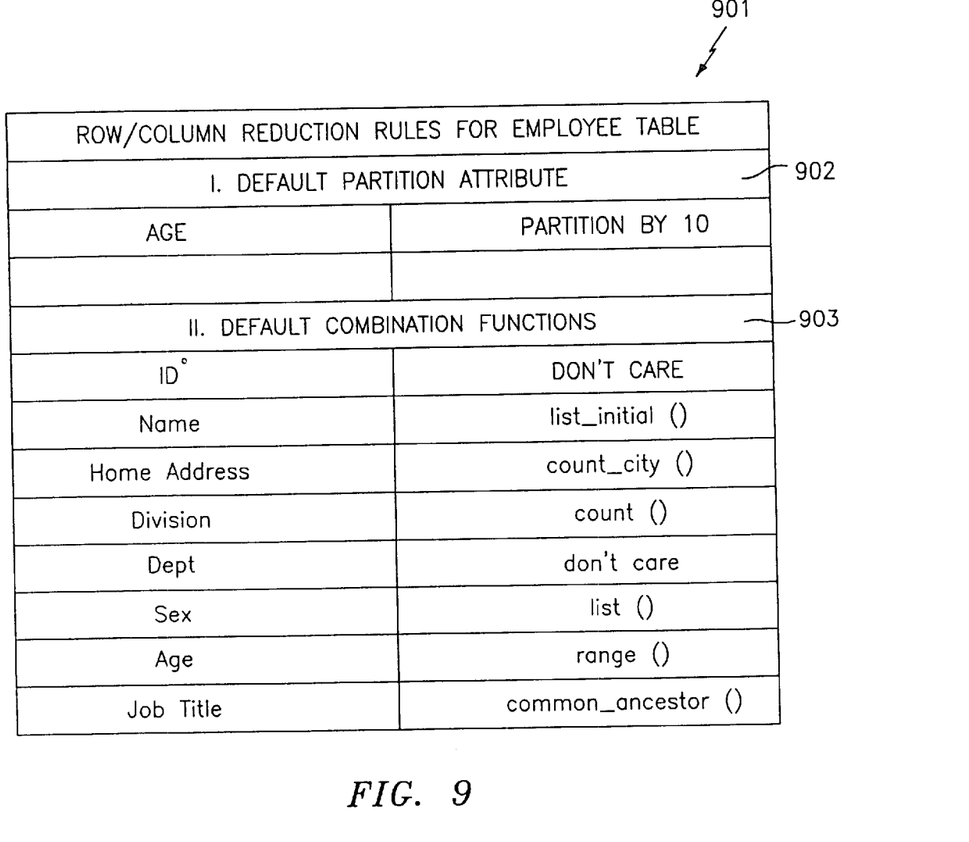
FIG. 9 is an illustrative example of row/column table reduction rules (meta-data) in accordance with the present invention.
Figure 10:
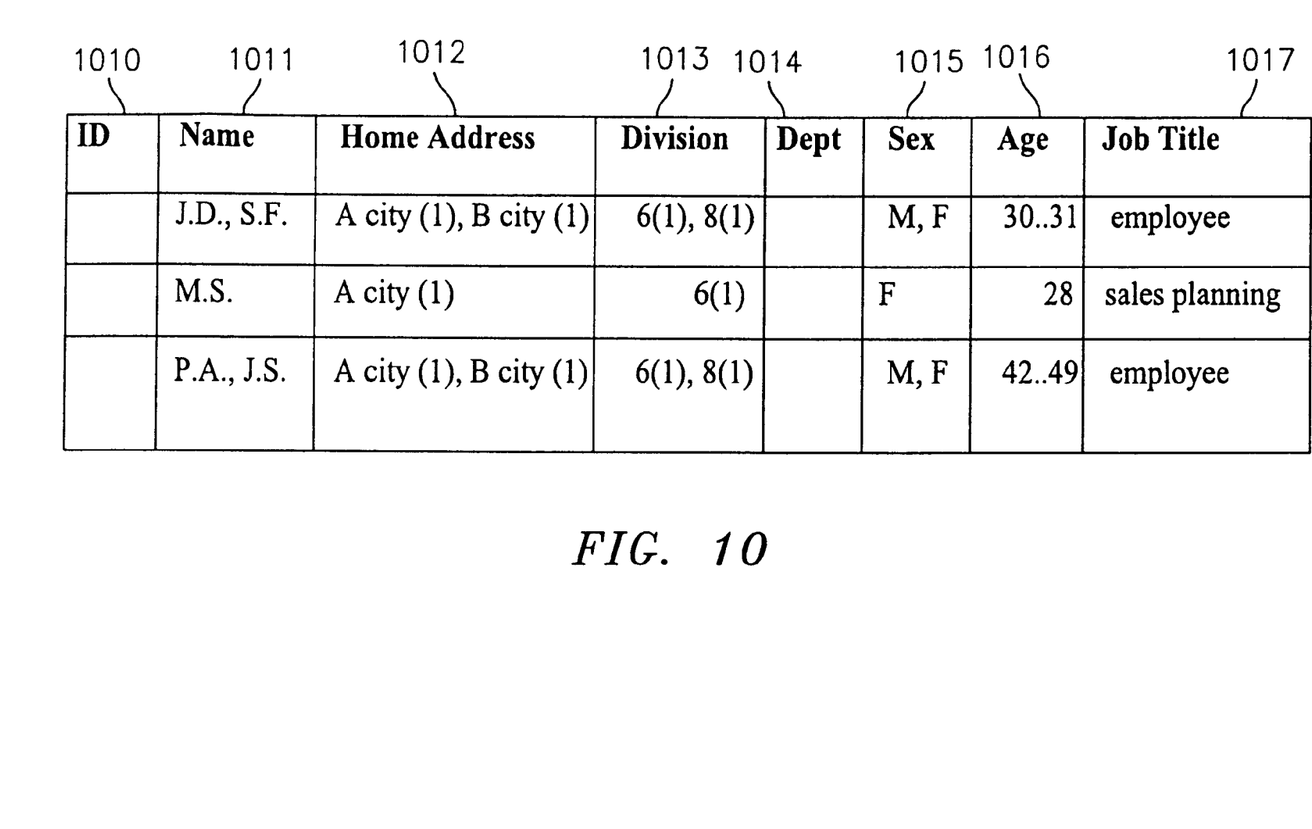
FIG. 10 is an illustrative example of a resultant summarized table of FIG. 8 using the row/column reduction rules (meta-data) of FIG. 9.

An illustrative example of the method of the present invention will be provided with reference to FIGS. 7–11. Each figure is briefly described as follows: FIG. 7 shows an exemplary Job Title hierarchy for employees of a computer company; FIG. 8 shows an example of employee records in an employee table, each record including a "Job Title" field 817; FIG. 9 illustrates meta-data which define the default row/column table reduction rules to be applied to the employee table of FIG. 8; FIG. 10 shows an example of a summarized table after applying the row/column table reduction rules illustrated in FIG. 9 to the original employee table of FIG. 8; FIG. 11a illustrates user viewing preference rules; and FIG. 11b shows an example of record entries in an employee table based on the user viewing preference specified in FIG. 11a. Each figure will be described in detail below.

FIG. 7

FIG. 7 is an example of a Job Title hierarchy of an employee table. FIG. 7 is provided to support an understanding of how a record field (i.e., Job Title) may be compressed (collapsed) in accordance with the method of the present invention. The significance of FIG. 7 will become more apparent with reference to the subsequent figures. In the illustrated Job Title hierarchy, at an uppermost hierarchical level all employees 701 can be generally partitioned into R&D 703 and Sales 702. R&D employees are then further partitioned into Research employees 704 and Development employees 705. Research employees can then be further divided into more distinguishable job categories, including RSM 706 as shown. Development can also be further divided into more distinguishable categories, such as Project Manager 707. Similarly, Sales employees 702 can be further divided into Field Sales employees 708 and Sales Planning employees 709.

FIG. 8

FIG. 8 is a table of employee records where each record contains a plurality of fields describing various attributes for each employee. The employee table 818 includes employee records where each record includes a plurality of record fields: ID 810, Name 811, Home Address 812, Division 813, Dept 814, Sex 815, Age 816, and Job Title 817. In particular, the Job Title Field 817 describes the employee's job with reference to the job title hierarchy of FIG. 7. In accordance with the illustrated example, the table of FIG. 8 is illustrated in summarized form in FIGS. 9 and 10 whereby summarization is performed using meta-data rules in FIG. 9 and using a user viewing preference ruleset in FIG. 10.

FIG. 9

FIG. 9 is an illustrative example of table reduction rules (i.e., meta-data) specific to the employee table of FIG. 8. The table reduction rules 901 can be generally into a default partition attribute 902 having an associated partition method and combination functions 903, both of which are required meta-data inputs for performing row reduction by the table summarizer module 233 of the proxy server 203.

In the present example, the exemplary default partition attribute 902 for performing row reduction is selected to be the "Age" attribute 816, and the associated partition method states "partition by 10". That is, every 10 rows are to be combined.

The row combination functions 903 specifies how the column attribute (e.g., Home Address, Division, Department, etc.) is to be displayed when row reduction summarization occurs. In the present example, for the attribute Home Address 812 (see FIG. 8), the combination function is count_city( ). Each attribute always has an associated default combination function. In the present example, the "Home Address" field of the summarized row will display the number of cities from each original row. For the attribute Job Title 817, the associated combination function is common_ancestor( ). That is, the "Job Title" field of the summarized row will display the common ancestor of the job titles in each of the original rows. Referring to FIG. 7, the common ancestor for the job titles RSM 706 and Project Manager 707 is R&D 703. Therefore, the "Job Title" field of the summarized row would display only R&D 703 instead of RSM 706 or Project Manager 707.

FIG. 10

FIG. 10 is an example of a resultant summarized table of the original table of FIG. 8, summarized in accordance with the meta-data rules illustrated in FIG. 9. According to the table reduction rules specified in FIG. 9, the partition attribute is "Age" and the partition method is by 10. By way of example, all the rows with age ranging from 30–39 are grouped together to form a single new resultant row. Referring to the table of FIG. 8, the first row 819 and fourth row 822 table entries would be combined into a single new resultant row because the "Age" field for each record is 30 and 31, respectively. Similarly, as a further example, records from third row 821 and fifth row 823 would satisfy the partition criteria of 40–49, and as such would be combined into another new resultant low.

The values for each column of the new row is determined by the default row combination functions 903 specified in FIG. 9. Referring to FIG. 9, each record field is shown with as associated combination function 903. In particular the "ID" field is shown with a combination function specifying "don't care". Therefore, the resultant ID column 1010 would display a blank field indicating a don't care condition. Next, the "NAME" field's associated combination function is list_initial( ). The resulting NAME column 1011 would therefore display a list of name initials. The resulting HOME_ADDRESS 1012 column would display a list of city_names and an associated occurrence count as set forth in function 903. For example, "Buffalo (2) Cincinnati (3) NY (4)". The division column 813 would display the number of employees in a division.

Referring to the illustrative table of FIG. 10, the Division column 1013 would display "Division 6 (1), Division 8 (1)". The DEPT. column 1014 would display a blank field indicating a "don't care" condition. The SEX column 1015 would display a list containing each maletfemale occurrence. The AGE column 1016 would display the range of the combined row. The JOB TITLE column 1017 would display the common ancestor of the combined row.

FIGURE 11

Figure 11A:
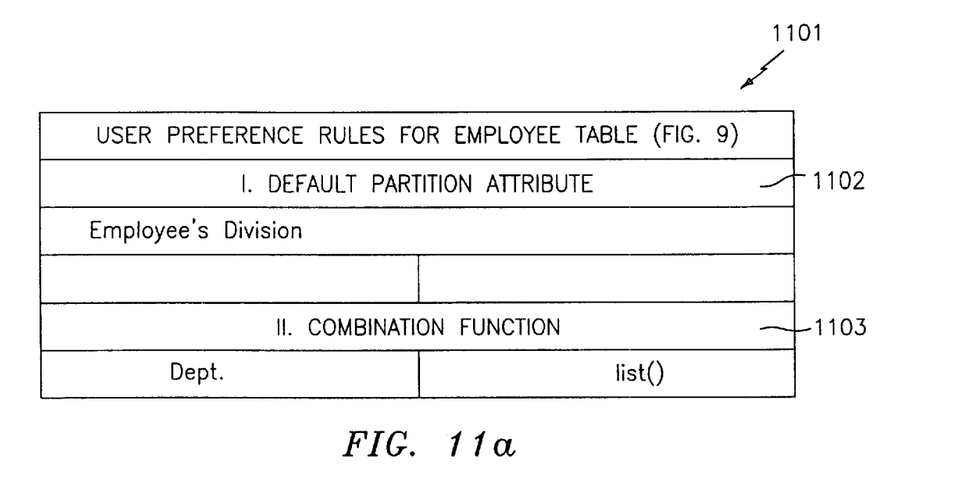
FIG. 11a is an illustrative example of user specified viewing ruleset.
Figure 11B:
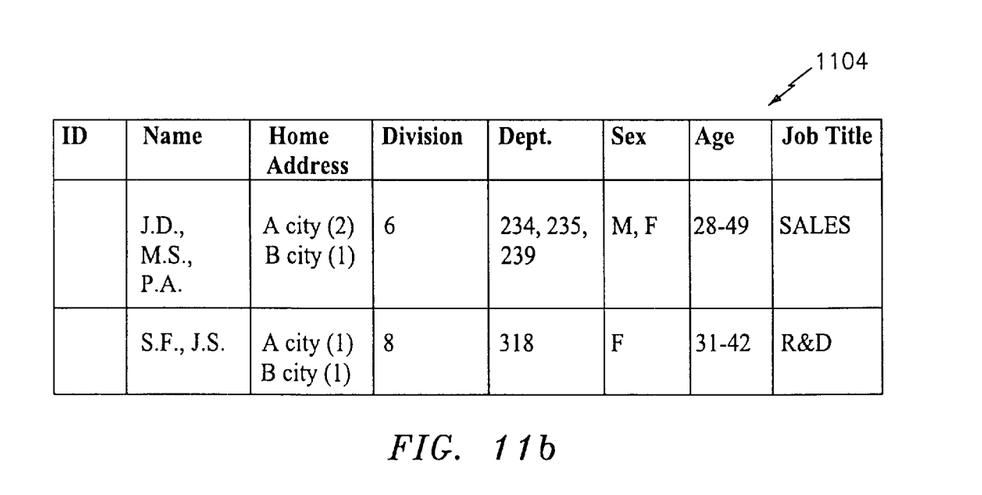

Referring to FIGS. 11a and 11b, FIG. 11a illustrates a user viewing preference ruleset 1101 specific to the employee table of the present example (FIG. 10). Similar to the meta-data description, the user viewing preference ruleset is subdivided into a partition attribute specification 1102 and a combination function specification 1103. FIG. 11b is an illustration of the employee-table 1104 summarized in accordance with the user viewing preference ruleset 1101 of FIG. 11a.

As previously stated, in the situation where a user viewing preference ruleset has been specified (i.e., pre-registered), any rules contained in the user specification will prevail over a corresponding rule from the default row/column reduction rules.

Referring to FIGS. 11a and 11b, FIG. 11a illustrates a user viewing preference ruleset 1101 specific to the employee table of the present example (FIG. 8). Similar to the meta-data description, the user viewing preference ruleset is subdivided into a partition attribute specification 1102 and a combination function specification 1103. FIG. 11b is an illustration of the employee-table 1104 summarized in accordance with the user viewing preference ruleset 1101 of FIG. 11a.

It should be noted that even after table summarization is performed, there may still be too many rows to fit into the display. In consideration of the viewing devices display capabilities in this case, the proxy server can display only the top few rows and then provide a link to the remaining undisplayed rows.

It should also be appreciated that other row/column reduction rules and user preference rules can be specified than those used in the illustrative example. Furthermore, depending on the data type, various methods can be used for row reduction. For example, for any generic data type, if all the rows to be combined contain the same value for an attribute, then the same value can be used. Alternatively, a majority value or a value plus the row count of the original rows can be used. For numeric data types, the average, the maximum, the minimum, or the range of values can be used for row reduction. For ASCII data types, one can simply list a set of keywords, or a first sentence/paragraph, etc. The keywords can be predetermined into a keyword set or can be looked up from a dictionary. Keywords can also be simply identified by the occurrence counts of those words. For other data types with specific semantics, such as the Job Title hierarchy in FIG. 7, the common ancestor in the semantic domain can be used.

Similarly, in column reduction, a number of alternatives exist. One is simply to drop the column. Another alternative is to reduce the data type into a shorter format. For example, for a salary of $123,456, one can simply show 123K. For a heart disease, one can simply use an abbreviation of HD. Yet another alternative is to merge multiple columns into a single one. For example, one can combine two columns Sex=F and Age=25 into a single column Sex/Age=F/25. For a three-column address, such as Street, City, and Zip Code, one can merge them into a single column with all the information combined.

As an exemplary alternative application of the table summarization method of the present invention, the method can be applied to summarize unread e-mails. As more and more people rely on e-mails for their communication, the e-mail box can easily contain a very long list of new e-mails. This is particularly true if e-mails go unread for a few days. The summarization can be based on the sender or the subject key words of the e-mails. Thus, the resultant items may show that there are "N" e-mails from sender Mary@us.ibm.com, "M" e-mails from sender John@us.ibm.com, . . . , etc. As for the alternative display, the resultant e-mail summary may show that there are "N" e-mails on a subject containing keyword "party", "M" e-mails on subject containing keywords "project" and "urgent", . . . , etc. The user can specify his/her preference with a simple tool and the mail program will decide if a summarization is needed, depending on the number of the unread e-mails in the mailbox.

Those skilled in the art will also appreciate that a hyperlink can be embedded in an object so that the viewer can click on a summarized row and receive the original rows in detail, thus providing further user interactivities.

It should be noted that the present invention is not limited in any way to Internet applications, and may also be applied to database applications, for example, by reducing the number of rows for easier browsing of a large table. Further, the present invention is not restricted in any way to tables, but rather, is more generally applicable to a generic data structure.

While the invention is susceptible to various modifications and alternative forms, specific embodiments thereof have been shown by way of example in the drawings and have been described herein in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method for transforming an unrevised data table into a revised data table, said unrevised data table having a plurality of rows and columns, the unrevised data table further including data elements having a plurality of data formats, the method comprising the steps of:
   defining meta-data associated with said unrevised data table, said meta-data selected from the group consisting of row reduction rules, row combination rules, column reduction rules, column combination rules, and column value transformation;
   receiving a request to view the unrevised data table from a viewing device; and
   transforming the unrevised data table in response to said request to view the unrevised data table by the viewing device in accordance with said meta-data, resulting in the revised data table capable of having at least one less row and column than the unrevised data table;
   wherein the unrevised data table is a single data table.

2. The method of claim 1, wherein said data table transformation is performed by one of a content server, a proxy server and said viewing device.

3. The method of claim 2, wherein said data table transformation further occurs in accordance with a ruleset associated with said viewing device's capabilities, wherein said associated ruleset includes at least one of row reduction and combination rules and column reduction and combination rules.

4. The method of claim 1, wherein said data table transformation is performed in accordance with said meta-data, a ruleset associated with the viewing device's capabilities and a user entered viewing preference ruleset, wherein said ruleset associated with the viewing device's capabilities and said user entered ruleset include at least one of row reduction and combination rules and column reduction and combination rules.

5. The method of claim 4, wherein if a rule is specified by both the viewing preference ruleset and the meta-data the viewing preference rule set will be exclusively used.

6. The method of claim 1, wherein the meta-data rules includes the steps of,
   (i) partitioning the plurality of rows in the unrevised data table into row groups;
   (ii) performing a row reduction on each row group by reducing each row group to a corresponding resultant row;
   (iii) partitioning the plurality of columns in the unrevised data table into column groups; and
   (iv) performing a column reduction by assigning a column attribute value to each resultant row in the revised data table based on said meta-data, the viewing device display capability and the user viewing preference ruleset when specified.

7. The method of claim 6, wherein the step of partitioning the plurality of rows in the unrevised data table into row groups further includes a step of selecting a column attribute value.

8. The method of claim 7, wherein the step of partitioning the plurality of rows in the unrevised data table into row groups is based on a hierarchy of the column attribute values, said step further including the steps of:
   (a) obtaining a hierarchical grouping of the column attribute values; and
   (b) partitioning the rows into row groups taking into account the hierarchical grouping and a viewing device's display characteristics and viewing preference.

9. The method of claim 8, wherein the step of partitioning based on hierarchy includes the steps of:
   (a) obtaining a hierarchical grouping of the attribute values from the concept hierarchy;
   (b) selecting a target level of the concept hierarchy for row partitioning based on the viewing device's display characteristics and viewing preference;
   (c) partitioning the rows into row groups, wherein each row group corresponds to a column attribute at a selected target level of the hierarchical grouping.

10. The method of claim 9, wherein the column attribute value for a resultant row in the revised data table is a common value of the set of column attribute values of the corresponding rows and columns in the unrevised data table when the column attribute values in the unrevised data table all share the same value.

11. The method of claim 10, wherein the hierarchical grouping of column attribute values is derived to minimize the difference in the number of rows defining each row group.

12. The method of claim 8, wherein the column attribute value assigned to each resultant row in the revised data table is the row count of the number of rows in the unrevised data table.

13. The method of claim 8, wherein the hierarchical grouping of column attribute values is derived dynamically based on said column attribute values.

14. The method of claim 13, wherein the hierarchical grouping of column attribute values is derived based on value ranges in said columns.

15. The method of claim 6, wherein the column attribute value for a resultant row in the summarized data table is derived from the column attribute values of the corresponding rows of the unrevised data table and a column partition rule in the meta-data.

16. The method of claim 15, wherein the column attribute value for the resultant row is one of a maximum, a minimum, an average, a range and a most popular value of the column attribute values of the corresponding rows and a column partition rule in the unrevised data table when the column attribute values in the unrevised data table are numeric.

17. The method of claim 15, wherein the column attribute value for the resultant row is derived from the application of the column partition rules to a summary of the words from the set of column attribute values of the corresponding row in the unrevised data table when the column attribute values in the unrevised data table are non-numeric.

18. The method of claim 17, wherein the word summary can be keyword-based or dictionary-based.

19. The method of claim 17, wherein the column attribute value for the resultant row is a subset of the words from the set of column attribute values of the corresponding rows and column partition rules in the unrevised data table when the column attribute in the unrevised data table are non-numeric.

20. The method of claim 19, wherein the subset of words is defined by a set of predetermined keywords in the meta-data.

21. The method of claim 19, wherein the words selected are based on frequency of occurrence.

22. A computer program device readable by a machine, tangibly embodying a program of instructions executable by the machine to perform method steps for transforming a data table in response to a viewer request, said method steps comprising:
   defining meta-data associated with said data table, said meta-data comprising row reduction and combination rules, said meta-data further comprising column reduction and column combination rules and a column value transformation; and
   transforming the data table in response to a request to view said data table by a viewing device in accordance with said meta-data resulting in a revised data table capable of having at least one less row and column than said data table;
   wherein said data table is a single data table.

23. The method of claim 22, wherein said table transformation is performed by one of a content server, a proxy server and said viewing device.

24. The method of claim 23, wherein said transformation further occurs in accordance with a ruleset associated with said viewing device's capabilities, wherein said associated ruleset includes at least one of row reduction and combination rules and column reduction and combination rules.

25. The method of claim 22, wherein said table transformation is performed in accordance with said meta-data, a ruleset associated with the viewing device's capabilities and a user entered viewing preference ruleset, wherein said ruleset associated with the viewing device's capabilities and said user entered ruleset include at least one of row reduction and combination rules and column reduction and combination rules.

26. The method of claim 25, wherein if a rule is specified by both the viewing preference ruleset and the meta-data the viewing preference rule set will be exclusively used.

* * * * *